US009801182B2

(12) United States Patent
Kubota

(10) Patent No.: US 9,801,182 B2
(45) Date of Patent: *Oct. 24, 2017

(54) RADIO COMMUNICATION SYSTEM, RADIO COMMUNICATION APPARATUS, AND CIPHERING METHOD

(71) Applicant: NEC Corporation, Tokyo (JP)

(72) Inventor: Keiichi Kubota, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/048,036

(22) Filed: Feb. 19, 2016

(65) Prior Publication Data

US 2016/0174228 A1    Jun. 16, 2016

Related U.S. Application Data

(63) Continuation of application No. 13/951,361, filed on Jul. 25, 2013, which is a continuation of application (Continued)

(30) Foreign Application Priority Data

Dec. 27, 2007  (JP) ................. 2007-336729

(51) Int. Cl.
  *H04W 72/04* (2009.01)
  *H04W 12/02* (2009.01)
  (Continued)

(52) U.S. Cl.
  CPC ....... *H04W 72/0453* (2013.01); *H04W 12/02* (2013.01); *H04W 28/18* (2013.01);
  (Continued)

(58) Field of Classification Search
  CPC . H04W 72/0453; H04W 12/02; H04W 84/04; H04W 48/08; H04W 28/18; H04W 76/02
  See application file for complete search history.

(56) References Cited

U.S. PATENT DOCUMENTS 6,807,419 B1  10/2004 Laiho et al.
7,050,584 B1   5/2006 Hoffmann et al.
(Continued)

FOREIGN PATENT DOCUMENTS

CN   1934890 A   3/2007
CN  101005509 A   7/2007
(Continued)

OTHER PUBLICATIONS

"Introduction of CS voice over HSPA," Nokia Siemens Networks, Nokia Corporation, Huawei, Qualcomm Europe, AT&T, 3Gpp TSG-RAN-WG2 Meeting #60, R2-075403, 17 pages (Nov. 5-9, 2007).

(Continued)

*Primary Examiner* — Andrew Lai
*Assistant Examiner* — Chuong M Nguyen
(74) *Attorney, Agent, or Firm* — Wilmer Cutler Pickering Hale and Dorr LLP

(57) ABSTRACT

A radio communication apparatus includes a control unit that, if a radio access bearer (RAB) for a circuit switching domain is reconfigured between a dedicated channel (DCH) and enhanced uplink dedicated channel/High Speed Downlink Packet Access (E-DCH/HSDPA) and an RAB corresponded to RAB information exists as an established RAB and there exists no transparent mode (TM) radio bearer for a core network (CN) domain included in an information element of CN domain identity (ID), and at least one TM radio bearer is included in an information element of radio bearer (RB) information to setup, calculates a start value that is used on a new RAB.

16 Claims, 12 Drawing Sheets

Related U.S. Application Data

No. 12/734,964, filed as application No. PCT/JP2008/073753 on Dec. 26, 2008, now Pat. No. 8,509,437.

(51) Int. Cl.
| | | |
|---|---|---|
| *H04W 28/18* | (2009.01) | |
| *H04W 48/08* | (2009.01) | |
| *H04W 76/02* | (2009.01) | |
| *H04W 84/04* | (2009.01) | |

(52) U.S. Cl.
CPC .......... *H04W 48/08* (2013.01); *H04W 76/02* (2013.01); *H04W 84/04* (2013.01)

(56) References Cited

U.S. PATENT DOCUMENTS

| | | | |
|---|---|---|---|
| 7,085,294 B2 | 8/2006 | Longoni et al. | |
| 7,233,671 B2 | 6/2007 | Wu | |
| 7,852,803 B2 | 12/2010 | Kim | |
| 8,509,437 B2* | 8/2013 | Kubota | H04W 12/02 370/328 |
| 9,307,534 B2* | 4/2016 | Kubota | H04W 12/02 |
| 2001/0046240 A1 | 11/2001 | Longoni et al. | |
| 2003/0156721 A1 | 8/2003 | Widman | |
| 2003/0210714 A1 | 11/2003 | Wu | |
| 2003/0235212 A1 | 12/2003 | Kuo | |
| 2004/0038668 A1 | 2/2004 | Ho | |
| 2004/0162055 A1* | 8/2004 | Wu | H04W 12/10 455/410 |
| 2004/0203971 A1 | 10/2004 | Kuo | |
| 2004/0228491 A1 | 11/2004 | Wu | |
| 2005/0037759 A1 | 2/2005 | Sipila et al. | |
| 2006/0194580 A1 | 8/2006 | Gruber | |
| 2007/0047452 A1 | 3/2007 | Lohr et al. | |
| 2007/0178878 A1 | 8/2007 | Ding | |
| 2008/0008152 A1 | 1/2008 | Lohr et al. | |
| 2008/0064390 A1 | 3/2008 | Kim | |
| 2008/0232331 A1 | 9/2008 | Ueda | |
| 2010/0087154 A1 | 4/2010 | Englund et al. | |

FOREIGN PATENT DOCUMENTS

| | | |
|---|---|---|
| EP | 1448009 A2 | 8/2004 |
| EP | 1689130 A1 | 8/2006 |
| JP | 11-017673 | 1/1999 |
| JP | 2002-523974 A | 7/2002 |
| JP | 2003-515998 A | 5/2003 |
| JP | 2003-529288 A | 9/2003 |
| JP | 2004-248235 A | 9/2004 |
| JP | 2004-248253 A | 9/2004 |
| JP | 2007-053747 A | 3/2007 |
| JP | 2007-215195 A | 8/2007 |
| KR | 10-0556591 B1 | 3/2006 |
| WO | WO-00/28744 A2 | 5/2000 |
| WO | WO-2002/082715 A1 | 10/2002 |

OTHER PUBLICATIONS

3GPP TS 25.331, V7.6.0, 10.3.3.38, 8.5.9, 3rd Generation Partnership Project; Technical Specification Group Radio Access Network; Radio Resource Control (RRC); Protocol Specification (Release 7), 5 pages (Sep. 2007).

3GPP TS 25.331, V8.0.0, 3rd Generation Partnership Project; Technical Specification Group Radio Access Network; Radio Resource Control (RRC); Protocol Specification (Release 8), 10 pages (Sep. 2007).

3GPP TS 33.102, V7.1.0, 6.6.3, 6.6.4, 3rd Generation Partnership Project; Technical Specification Group Services and System Aspects; 3G Security; Security architecture (Release 7), 5 pages (Dec. 2006).

Change Request 25.331, CR CR3214, 3GPP TSG-RAN-WG2, Meeting #60, Jeju, Korea, R2- 075403 (Nov. 5-9, 2007) (17 pages).

Chinese Office Action corresponding to Chinese Application No. 201310140985.3, dated Jun. 23, 2015, 11 pages.

Chinese Office Action issued by the State Intellectual Property Office of the People's Republic of China for Chinese Application No. 200880123205.1 dated Jul. 20, 2012 (17 pages).

Extended European Search Report issued by the European Patent Office for European Application No. 08865969.3 dated Jan. 3, 2013 (8 pages).

Korean Office Action issued by the Korean Intellectual Property Office for Korean Application No. 10-2010-7016832 dated Feb. 15, 2012 (3 pages).

* cited by examiner

Fig.10

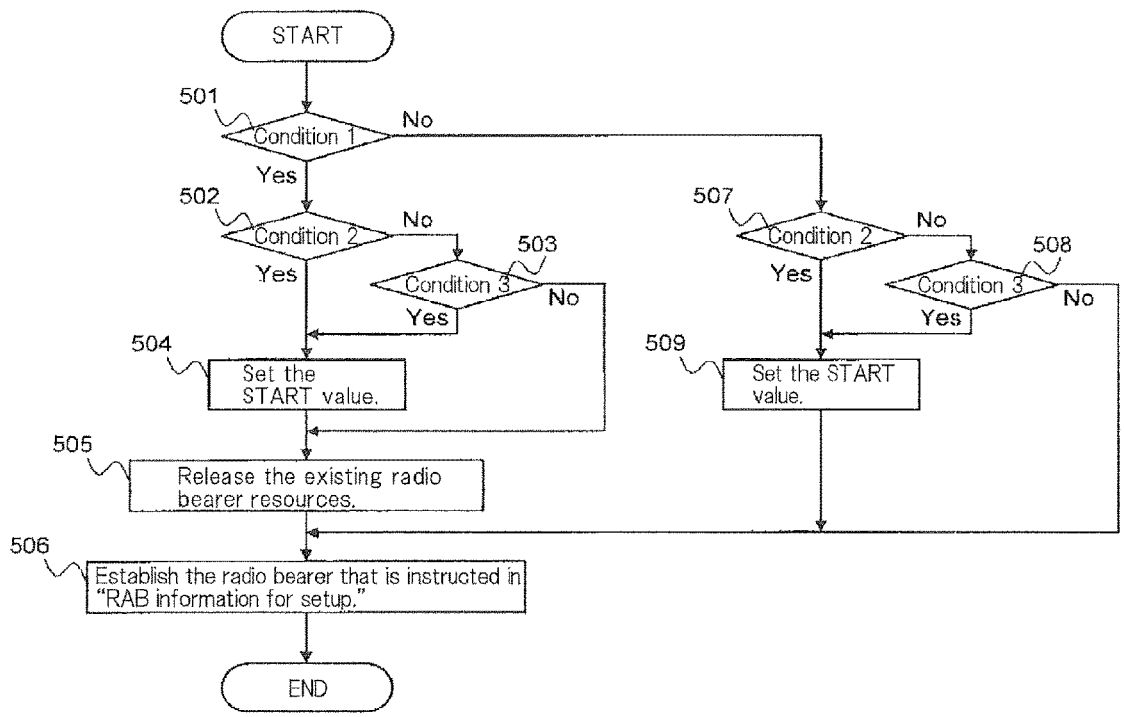

Condition 1:
Is this reconfiguration of a radio access bearer for a circuit switching domain from a DCH to an E-DCH/HSDPA, or reconfiguration from an E-DCH/HSDPA to a DCH?

Condition 2:
Does a TM radio bearer for a circuit switching domain currently not exist, and moreover, is at least one TM radio bearer included in "RB information to setup"?

Condition 3:
Is at least one radio bearer of an RLC-AM or an RLC-UM included in "RB information to setup"?

Fig.11

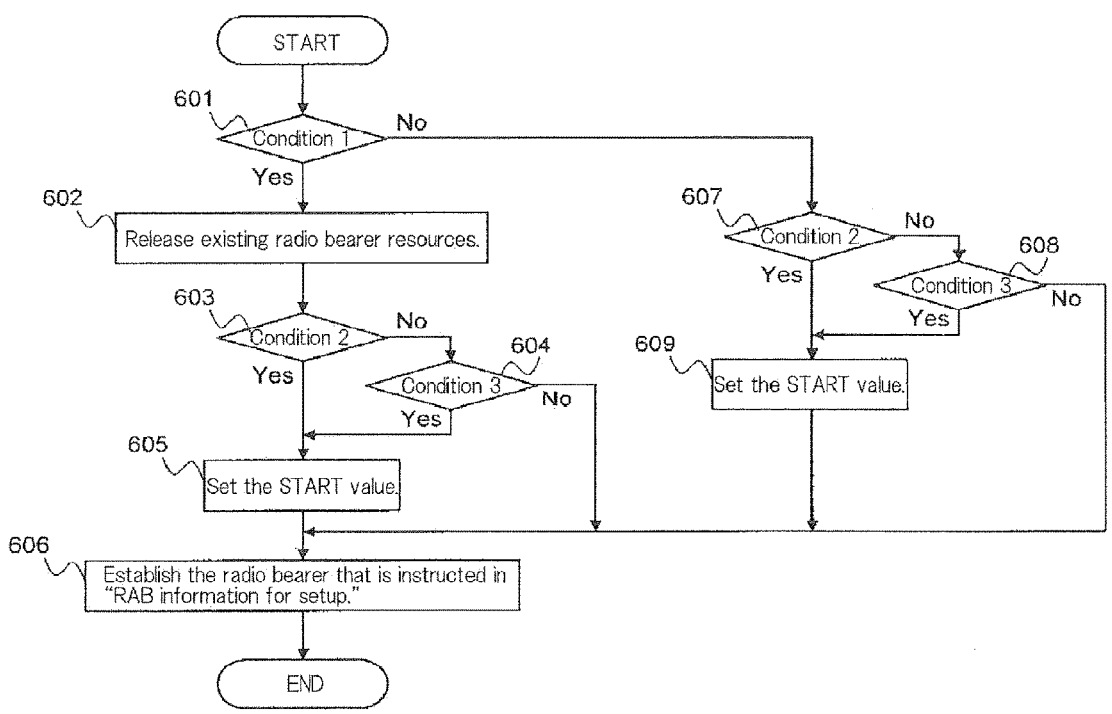

Condition 1:
Is this reconfiguration of a radio access bearer for a circuit switching domain from a DCH to an E-DCH/HSDPA, or reconfiguration from an E-DCH/HSDPA to a DCH?

Condition 2:
Does a TM radio bearer for a circuit switching domain currently not exist, and moreover, is at least one TM radio bearer included in "RB information to setup"?

Condition 3:
Is at least one radio bearer of an RLC-AM or an RLC-UM included in "RB information to setup"?

Fig.13

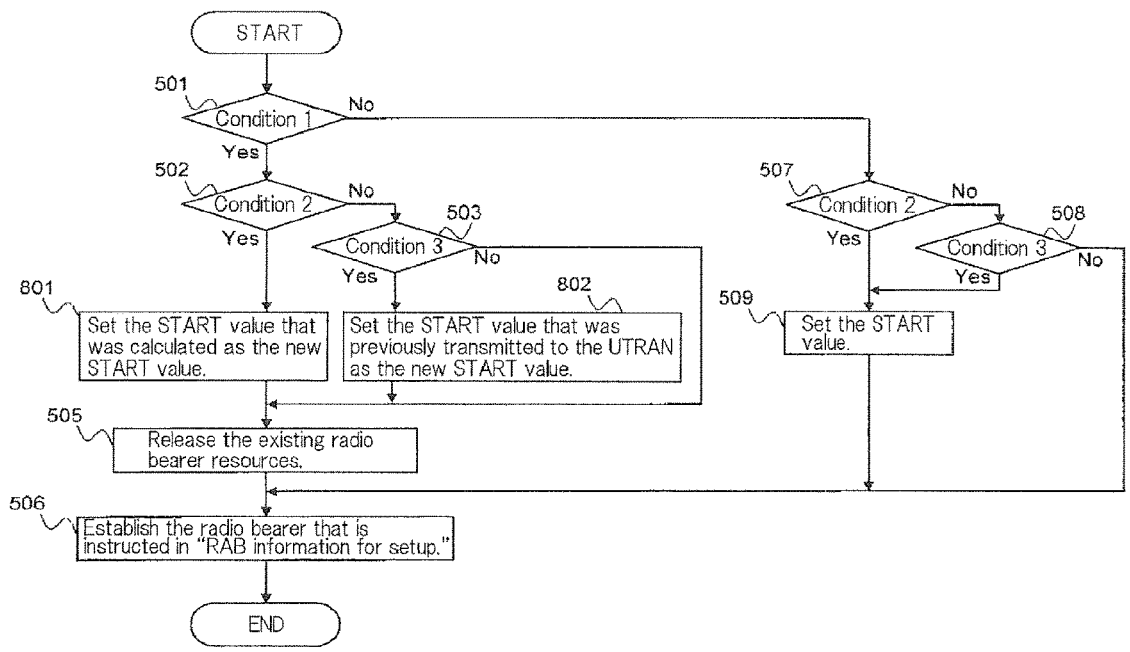

Condition 1:
Is this reconfiguration of a radio access bearer for a circuit switching domain from a DCH to an E-DCH/HSDPA, or reconfiguration from an E-DCH/HSDPA to a DCH?

Condition 2:
Does a TM radio bearer for a circuit switching domain currently not exist, and moreover, is at least one TM radio bearer included in "RB information to setup"?

Condition 3:
Is at least one radio bearer of an RLC-AM or an RLC-UM included in "RB information to setup"?

RADIO COMMUNICATION SYSTEM, RADIO COMMUNICATION APPARATUS, AND CIPHERING METHOD

This application is a Continuation Application of U.S. patent application Ser. No. 13/951,361 filed Jul. 25, 2013, which is a Continuation Application of U.S. patent application Ser. No. 12/734,964, filed on Jul. 19, 2010, now, U.S. Pat. No. 8,509,437, which is a National Stage of International Application No. PCT/JP2008/073753, filed on Dec. 26, 2008, which is based on and claims priority from Japan Patent Application No. 2007336729, filed on Dec. 27, 2007, the entire contents of which is incorporated herein by reference.

TECHNICAL FIELD

The present invention relates to technology for making ciphering configuration of a circuit switched (CS) call in a radio communication system.

BACKGROUND ART

A radio communication system such as shown in FIG. 1 has been proposed as a radio communication system for carrying out processing of circuit switched calls in 3GPP (3rd Generation Partnership Projects).

The radio communication system shown in FIG. 1 is of a configuration in which UTRAN (Universal Terrestrial Radio Access Network) 10, which is a radio access network, is connected to CN (Core Network) 40.

MSC (Mobile-services Switching Center) 50 is provided in CN 40, and RNC (Radio Network Controller) 20 and Node-B (base station apparatus) 30 are provided in UTRAN 10. However, in some forms of UTRAN 10, the functions of RNC 20 are taken in by Node-B 30 and RNC 20 is not provided. Node-B 30 is connected to UE (User Equipment) 60, which is a radio communication apparatus, by way of a radio interface.

Circuit switched calls include AMR frames and AMR-WB frames that have been encoded by an AMR (Adaptive Multi-Rate) codec and AMR-WB (AMR Wideband) codec, and these AMR frames and AMR-WB frames have until now been transmitted and received on DCH (Dedicated Channels). The function of transmitting and receiving this type of circuit switched calls by a DCH is referred to as CS voice over DCH.

As shown in FIG. 2, the architecture of this CS voice over DCH uses an UL-DPDCH (Uplink Dedicated Physical Data Channel) on uplink lines and a DL-DPDCH (Downlink Dedicated Physical Data Channel) on downlink lines. In an entity referred to as MAC (Media Access Control)-d, ciphering (encryption and decryption) is implemented in AMR frames and AMR-WB frames. A method such as disclosed in Non-Patent Document 1 is used for the ciphering method.

Here, overall operations when establishing a radio access bearer (RAB) for a circuit switching domain (CS domain) on a DCH to realize a CS voice over DCH in a radio communication system are described with reference to FIG. 3.

In the following explanation, the radio access bearer for a circuit switching domain is referred to as simply a "radio access bearer."

Explanation is presented on the assumption that messages transmitted and received between UE 60 and UTRAN 10 are RRC (Radio Resource Control) messages, and messages transmitted and received between UTRAN 10 and MSC 50 are RANAP (Radio Access Network Application Part) messages.

As shown in FIG. 3, an RRC connection is established between UE 60 and UTRAN 10 in state 1101.

In Step 1102, MSC 50 next transmits to UTRAN 10 a RAB ASSIGNMENT REQUEST message instructing that a radio access bearer to DCH be established.

Next, in Step 1103, UTRAN 10 secures and sets DCH resources and uses a START value that was previously transmitted from UE 60 to implement ciphering configuration in the MAC. Here, the START value is an initial value used in the ciphering configuration of a circuit switched call. (For example, Non-Patent Document 2). In Step 1104, UTRAN 10 transmits a RADIO BEARER SETUP message including the information elements "RAB information for setup" instructing that a radio access bearer to DCH be established.

In Step 1105, UE 60 performs DCH settings that establish a DCH radio bearer in accordance with the instructions of the information elements "RAB information for setup" contained in the RADIO BEARER SETUP message that was received. In these DCH settings, both the setting of the START value and the ciphering configuration in the MAC that uses this START value are carried out. Still further, in Step 1106, UE 60 transmits to UTRAN 10 a RADIO BEARER SETUP COMPLETE message that includes the START value that was set.

UTRAN 10 subsequently, after using the START value that was transmitted from UE 60 to carry out updating of ciphering configuration in the MAC in Step 1107, transmits a RAB ASSIGNMENT RESPONSE message to MSC 50 in Step 1108.

Recently, however, a function referred to as "CS voice over HSPA" for transmitting and receiving AMR frames and AMR-WB frames by HSPA (High Speed Packet Access) was newly proposed in 3GPP RAN2 meeting #60 (Non-Patent Document 3). HSPA features higher transmission speed and higher frequency utilization efficiency than DCH.

In this CS voice over HSPA architecture, an E-DCH (Enhanced uplink DCH) is used on uplink lines and an HSDPA (High Speed Downlink Packet Access) that uses HS-DSCH is used on downlink lines, as shown in FIG. 4. In addition, as the ciphering of AMR frames and AMR-WB frames, encryption is carried out in an entity referred to as RLC UM TX (Radio Link Control Unacknowledged Mode Transmission)" and decryption is carried out in an entity referred to as RLC UM RX (RLC UM reception).

The overall operations when establishing a radio access bearer on an E-DCH/HSDPA to realize CS voice over HSPA in a radio communication system is here described with reference to FIG. 5.

As shown in FIG. 5, an RRC connection is first established between UE 60 and UTRAN 10 in state 1301.

In Step 1302, MSC 50 next transmits to UTRAN 10 a RAB ASSIGNMENT REQUEST message instructing the establishment of a radio access bearer on an E-DCH/HSDPA.

In Step 1303, UTRAN 10 secures and sets the E-DCH/HSDPA resources. In Step 1304, UTRAN 10 further transmits a RADIO BEARER SETUP message that includes the information elements "RAB information for setup" instructing the establishment of a radio access bearer on the E-DCH/HSDPA.

In Step 1305, UE 60 next carries out the E-DCH/HSDPA settings for establishing an E-DCH/HSDPA radio bearer in accordance with the "RAB information for setup" information element instructions contained in the RADIO BEARER SETUP message that was received. In these E-DCH/HSDPA settings, the setting of the START value and the ciphering configuration that use this START value are also carried out in RLC. Still further, in Step 1306, UE 60 transmits to UTRAN 10 a RADIO BEARER SETUP COMPLETE message including the START value that was set.

In Step 1307, UTRAN 10 then uses the START value that was transmitted from UE 60 to implement ciphering configuration in the RLC, and then, in Step 1308, transmits to MSC 50 a RAB ASSIGNMENT RESPONSE message.

Non-Patent Document 1: 3GPP TS 33.102 6.6.3 and 6.6.4
Non-Patent Document 2: 3GPP 25.331 V7.6.0, 10.3.3.38 and 8.5.9
Non-Patent Document 3: CHANGE REQUEST 25.331 CR CR3214

SUMMARY OF THE INVENTION

As described hereinabove, a radio access bearer can be established in each DCH or each E-DCH/HSDPA in a radio communication system.

However, even when a radio access bearer is established in an E-DCH/HSDPA, circuit switched calls cannot be transmitted and received on the E-DCH/HSDPA if, for example, UE 60 does not support CS voice over HSPA. As a result, in this case, the radio access bearer on an existing E-DCH/HSDPA must be released and a radio access bearer newly established on a DCH, i.e., the radio access bearer must be reconfigured from E-DCH/HSDPA to DCH.

Other cases in which the radio access bearer must be reconfigured from E-DCH/HSDPA to DCH, or from DCH to E-DCH/HSDPA include, for example, a case in which RNC 20 is switched or when UE 60 has moved.

When a radio access bearer is reconfigured between DCH and E-DCH/HSDPA, circuit switched calls must be remapped from E-DCH/HSDPA to DCH or from DCH to E-DCH/HSDPA.

As described hereinabove, in the case of the RLC TM (RLC Transparent Mode), i.e., CS voice over DCH, ciphering configuration are carried out in the MAC, and in the case of RLC UM, i.e., CS voice over HSPA, ciphering configuration are carried out in the RLC. Accordingly, when the radio access bearer is reconfigured between DCH and E-DCH/HSDPA, ciphering configuration must be newly implemented in the MAC or RLC.

However, the configuration of COUNT-C, which is one of the variables used in ciphering configuration, differs depending on the RLC mode (Non-Patent Document 1). The COUNT-C ciphering configuration before reconfiguration therefore cannot be passed over without modification to the new ciphering configuration after reconfiguration, and an initialization value (START value) used in the initialization of COUNT-C is necessary.

In the reconfiguration of a radio access bearer between DCH and E-DCH/HSDPA as described above, the START value must be newly set. However, because Non-Patent Document 3 makes no suggestions regarding the method of setting the START value when reconfiguring a radio access bearer between a DCH and an E-DCH/HSDPA, the problem arises that the ciphering executed on a circuit switched call cannot be properly achieved.

It is therefore an object of the present invention to provide a radio communication system, a radio communication apparatus, and a ciphering method that can solve the above-described problem.

The radio communication system of the present invention is a radio communication system that includes a radio access network and a radio communication apparatus, the radio communication apparatus including a control unit that, when reconfiguring a radio access bearer for a circuit switching domain between a DCH and an uplink line E-DCH and downlink line HSDPA, sets the initial value used after the reconfiguration in the encryption of the radio access bearer, and including a transceiver that transmits to the radio access network the initial value that was set in the control unit and that is to be used after the reconfiguration.

The radio communication apparatus of the present invention includes: a control unit that, when reconfiguring a radio access bearer for a circuit switching domain between a DCH and an uplink line E-DCH and downlink line HSDPA, sets the initial value to be used after the reconfiguration in the encryption of the radio access bearer; and a transceiver that transmits to the radio access network the initial value that was set by the control unit and that is to be used after the reconfiguration.

The ciphering method of the present invention is a ciphering method realized by a radio communication apparatus and includes steps of: when reconfiguring a radio access bearer for a circuit switching domain between a DCH and an uplink line E-DCH and a downlink line HSDPA, setting an initial value to be used after the reconfiguration in the encryption of the radio access bearer; and transmitting to a radio access network the initial value that was set to be used after reconfiguration.

By means of the present invention, when reconfiguring a radio access bearer between a DCH on one side and an E-DCH and HSDPA on the other, a radio communication apparatus sets an initial value to be used after reconfiguration in the encryption of the radio access bearer, and transmits to a radio access network.

Accordingly, when reconfiguring a radio access bearer, encryption can be carried out in both the radio communication apparatus and the radio access network using the new initial value that was set by the radio communication apparatus, whereby the effect is obtained in which proper ciphering executed on a circuit switched call is enabled.

BRIEF DESCRIPTION OF THE DRAWINGS

FIG. 10 is a flow chart for explaining the operation of the radio communication apparatus according to the second, third, and fifth exemplary embodiments of the present invention;

FIG. 11 is a flow chart for explaining the operation of the radio communication apparatus according to the fourth exemplary embodiment of the present invention;

FIG. 13 is a flow chart for explaining the operation of the radio communication apparatus according to the fifth exemplary embodiment of the present invention.

BEST MODE FOR CARRYING OUT THE INVENTION

Best modes for working the present invention are next described with reference to the accompanying figures.

Figure 1:
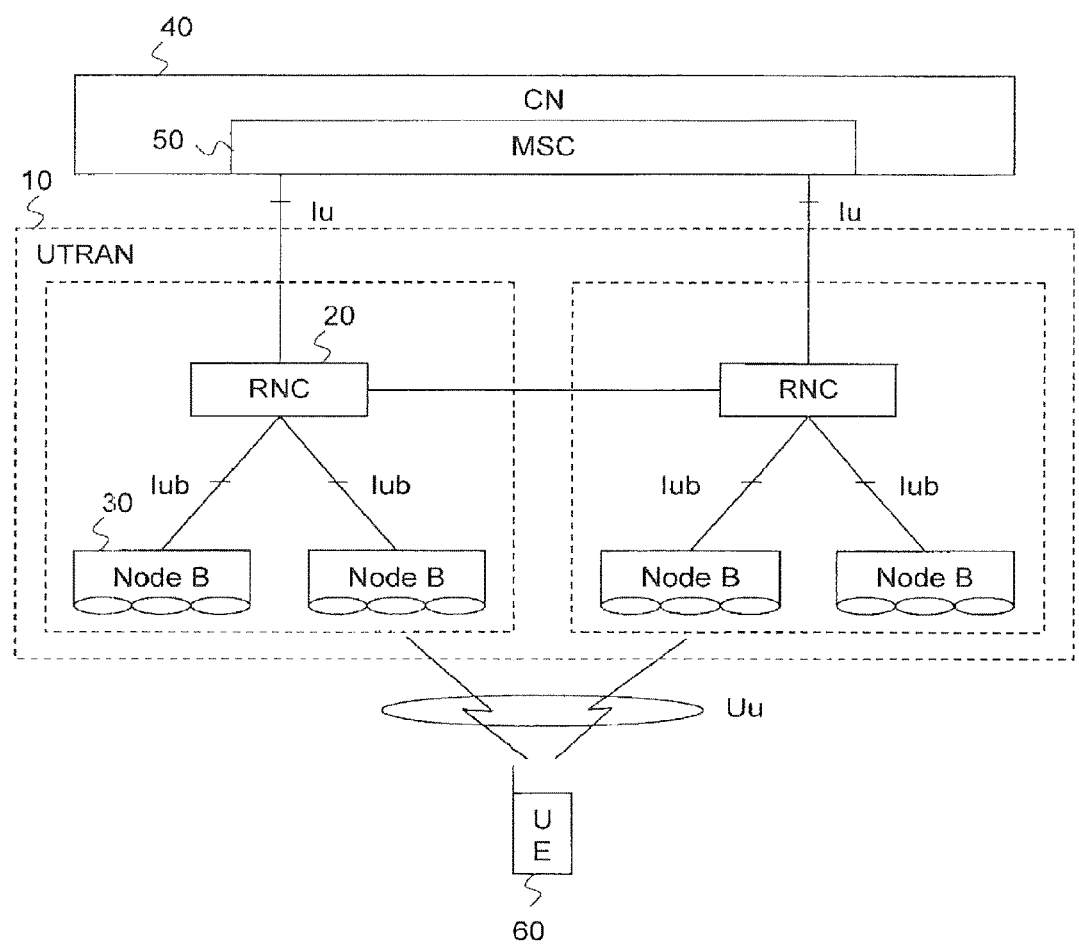
FIG. 1 shows the configuration of a radio communication system.
Figure 2:
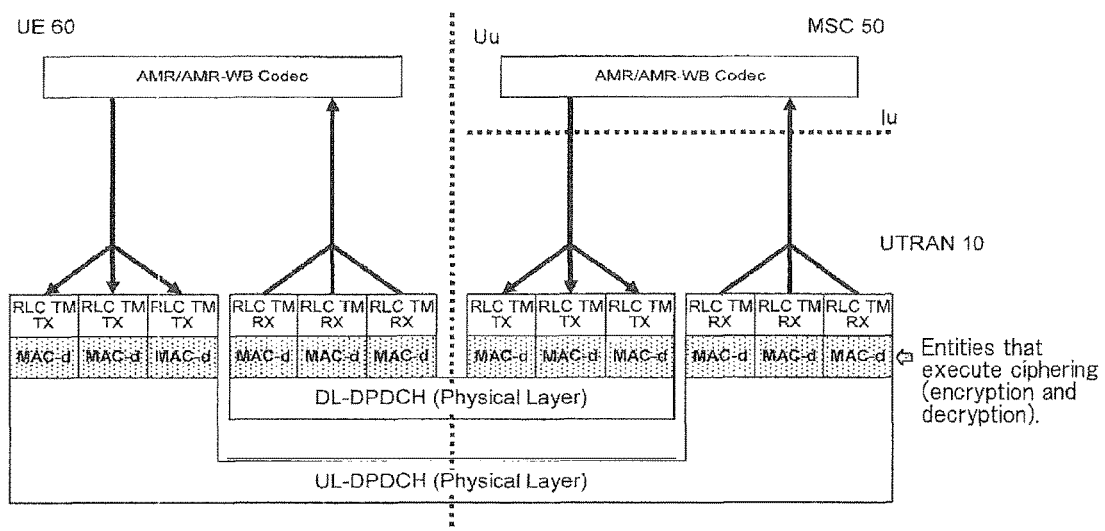
FIG. 2 is an explanatory view of the architecture of a CS voice over DCH.

In all of the exemplary embodiments described hereinbelow, the overall configuration of the radio communication system itself is the same as shown in FIG. 1.
(First Exemplary Embodiment)

Figure 6:
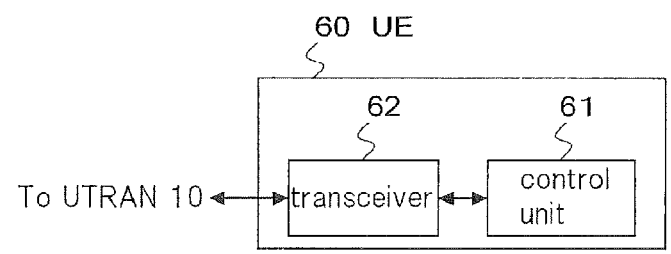
FIG. 6 is a block diagram showing the configuration of a radio communication apparatus according to the first to fifth exemplary embodiments of the present invention.

As shown in FIG. 6, UE 60 according to the present exemplary embodiment includes: control unit 61 that, when reconfiguring a radio access bearer between a DCH and an E-DCH/HSDPA, sets a new START value that is the initial value to be used in the ciphering configuration of a circuit switched call; and transceiver 62 that transmits to UTRAN 10 the new START value that was set in control unit 61.

The operations of UE 60 according to the present exemplary embodiment are next explained with reference to FIG. 7.

Figure 7:
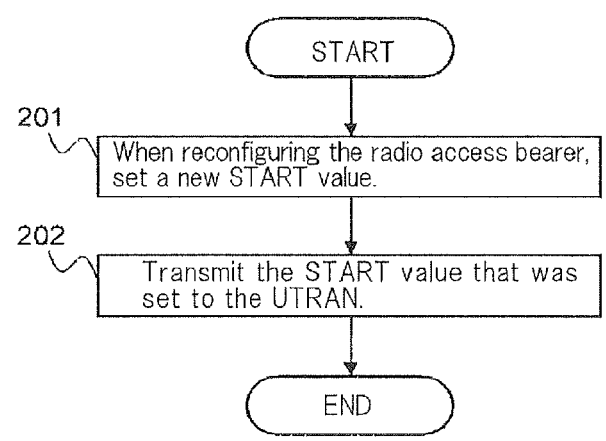
FIG. 7 is a flow chart for explaining the operations of the radio communication apparatus according to the first exemplary embodiment of the present invention.

As shown in FIG. 7, in Step 201, when reconfiguring radio access bearer between a DCH and an E-DCH/HSDPA, control unit 61 first sets a new START value that is used in the ciphering configuration of a circuit switched call.

In Step 202, transceiver 62 then transmits to UTRAN 10 the new START value that was set in control unit 61.

Accordingly, when reconfiguring a radio access bearer in the present exemplary embodiment, ciphering configuration can be carried out in both UE 60 and UTRAN 10 using the new initial value that was set in UE 60, whereby the effect is obtained in which proper ciphering executed on a circuit switched call is enabled.
(Second Exemplary Embodiment)

UE 60 according to the present exemplary embodiment is an example in which the operations of the first exemplary embodiment shown in FIG. 6 are more concrete, the configuration itself being the same as the first exemplary embodiment.

Control unit 61 carries out operations of, when reconfiguring a radio access bearer between a DCH and an E-DCH/HSDPA, calculating the START value before releasing the existing radio bearer resources, and setting the calculated START value as the new START value.

The operations of the present exemplary embodiment are next described.
[Overall Operations of a Radio Communication System]

Explanation first regards the overall operations of the radio communication system of the present exemplary embodiment. Because the overall operations when establishing a radio access bearer on a DCH and on an E-DCH/HSDPA are similar to the operations shown in FIGS. 3 and 5, only the overall operations when reconfiguring a radio access bearer between a DCH and an E-DCH/HSDPA are described here.

The overall operations when reconfiguring a radio access bearer from a DCH to an E-DCH/HSDPA are first described with reference to FIG. 8.

Figure 3:
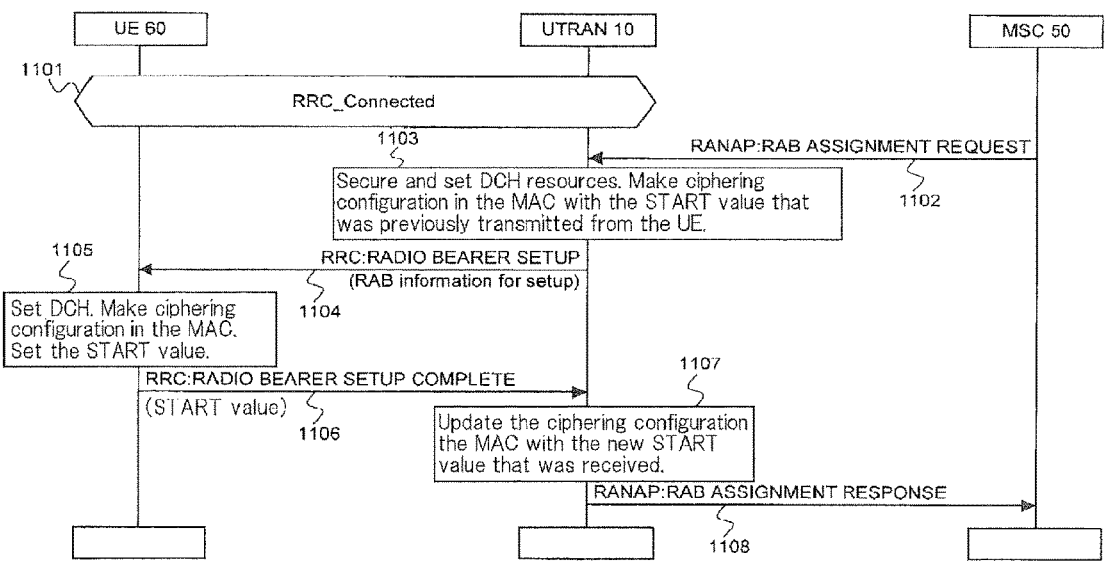
FIG. 3 is a sequence chart for explaining an example of the overall operations when establishing a radio access bearer on a DCH in a radio communication system.
Figure 4:
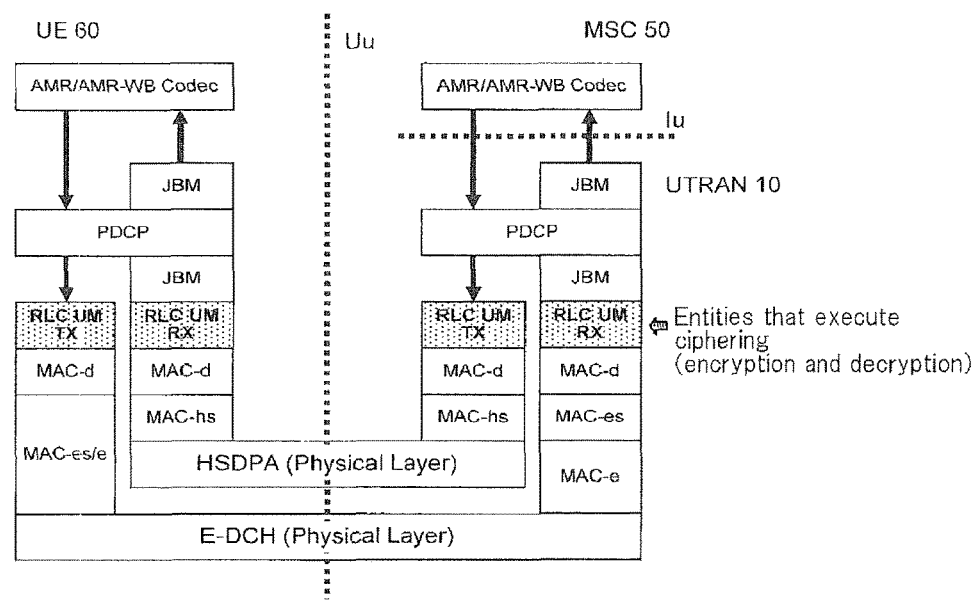
FIG. 4 is an explanatory view of the architecture of CS voice over HSPA.
Figure 8:
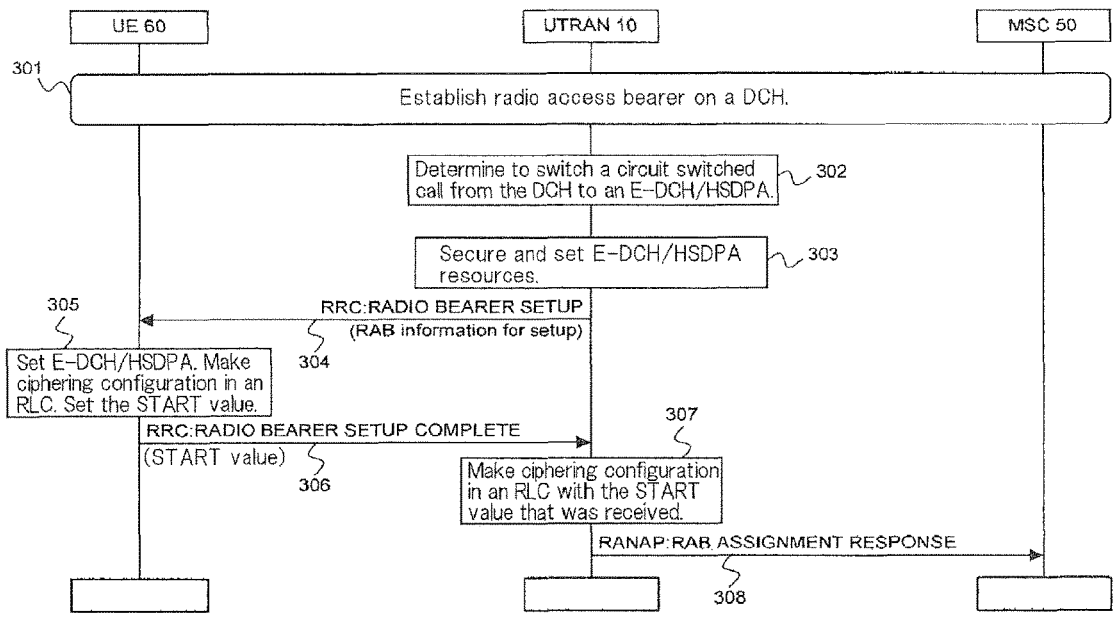
FIG. 8 is a sequence chart for explaining an example of the overall operations when reconfiguring a radio access bearer from a DCH to an E-DCH/HSDPA in a radio communication system.

It is here assumed that, as shown in FIG. 8, a radio access bearer is established on a DCH and a circuit switched call is mapped on the DCH in Step 301 by means of the operations shown in FIG. 3.

In this state, UTRAN 10 determines that the circuit switched call is to be remapped from the DCH to an E-DCH/HSDPA in Step 302.

In Step 303, UTRAN 10 next secures and sets the E-DCH/HSDPA resources. In Step 304, UTRAN 10 further transmits a radio bearer setup (RADIO BEARER SETUP) message that contains information elements of radio access bearer setup information (RAB information for setup) that instructs that a radio access bearer be established on the E-DCH/HSDPA.

In Step 305, UE 60 both releases the existing DCH resources and carries out the E-DCH/HSDPA settings that establish an E-DCH/HSDPA radio access bearer in accordance with the instructions of the information elements "RAB information for setup" that were contained in the RADIO BEARER SETUP message that was received. In these E-DCH/HSDPA settings, the setting of the START value and ciphering configuration in the RLC that use this START value are implemented in Step 306, UE 60 transmits to UTRAN 10 a RADIO BEARER SETUP COMPLETE message that includes the START value that was set.

In Step 307, UTRAN 10 then uses the START value that was transmitted from UE 60 to implement ciphering configuration in the RLC, and then, in Step 308, transmits to MSC 50 a radio access bearer assignment response (RAB ASSIGNMENT RESPONSE) message.

The overall operations when reconfiguring the radio access bearer from an E-DCH/HSDPA to a DCH are next described with reference to FIG. 9.

Figure 5:
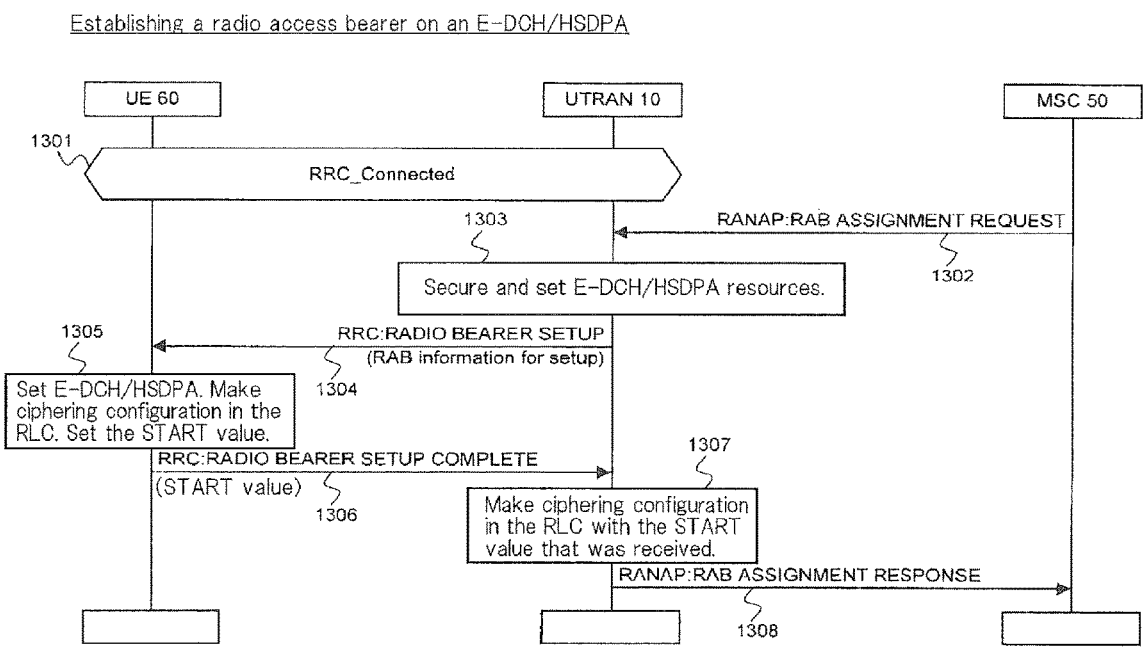
FIG. 5 is a sequence chart for describing an example of the overall operations when establishing a radio access bearer on an E-DCH/HSDPA in a radio communication system.
Figure 9:
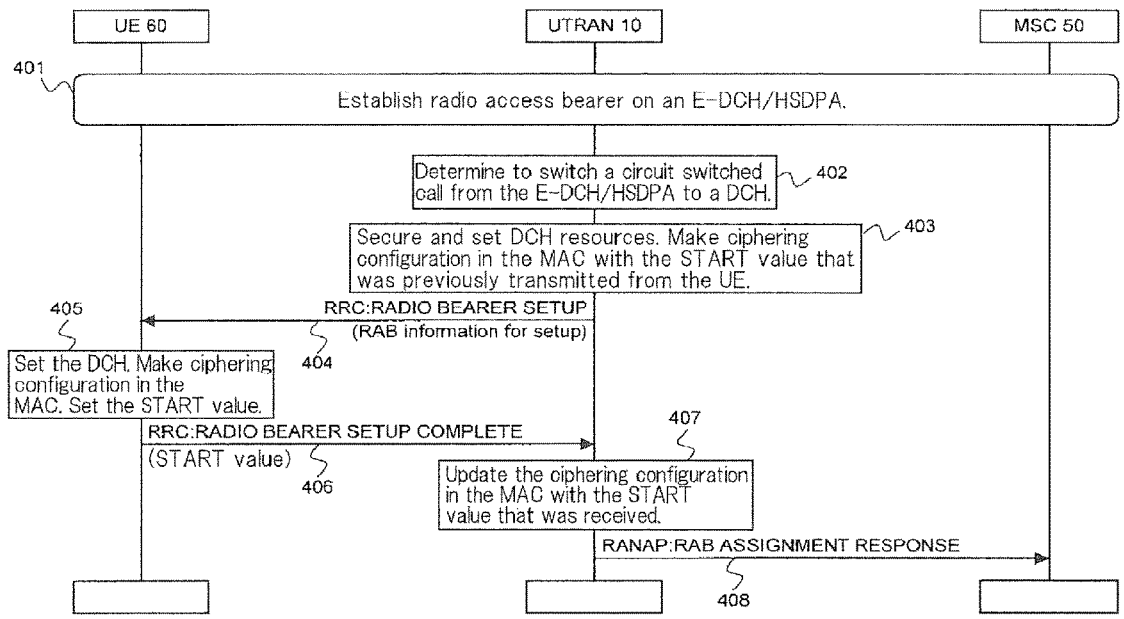
FIG. 9 is a sequence chart for explaining an example of the overall operations when reconfiguring a radio access bearer from an E-DCH/HSDPA to a DCH in a radio communication system.

As shown in FIG. 9, it is here assumed that in Step 401 a radio access bearer was established on an E-DCH/HSDPA and a circuit switched call was mapped on the E-DCH/HSDPA by means of the operations shown in FIG. 5.

In this state, UTRAN 10 determines in Step 402 to remap the circuit switched call from the E-DCH/HSDPA to a DCH.

In Step 403, UTRAN 10 secures and sets the DCH resources, and using a START value that was previously transmitted from UE 60, carries out ciphering configuration in the MAC. In Step 404, UTRAN 10 further transmits a RADIO BEARER SETUP message that includes the information elements "RAB information for setup" instructing the establishment of a radio access bearer on the DCH.

In Step 405, UE 60 both releases the existing E-DCH/HSDPA resources and implements the DCH settings that establish the DCH radio bearer in accordance with the instructions of the information elements "RAB information for setup" that were contained in the RADIO BEARER SETUP message that was received. In these DCH settings, the setting of a START value and ciphering configuration in the MAC that use this START value are implemented. In Step 406, UE 60 transmits to UTRAN 10 a RADIO BEARER SETUP COMPLETE message that contains the START value that was set.

Next, in Step 407, UTRAN 10 uses the START value that was transmitted from UE 60 to update the ciphering configuration in the MAC and then transmits a RAB ASSIGNMENT RESPONSE message to MSC 50 in Step 408.

[Operations of UE 60]

The operations of UE 60 according to the present exemplary embodiment are next described with reference to FIG. 10. Explanation here regards the operations that correspond to Steps 1105, 1305, 305, and 405 of FIGS. 3, 5, 8, and 9, respectively.

As shown in FIG. 10, in Step 501, control unit 61 determines whether or not a Condition 1 is satisfied for reconfiguration of the radio access bearer from an E-DCH/HSDPA to a DCH or for reconfiguration from a DCH to an E-DCH/HSDPA based on the "RAB information for setup" information elements contained in the RADIO BEARER SETUP message transmitted from UTRAN 10 , and proceeds to Step 502 (the succeeding processes corresponding to Steps 305 and 405 in FIGS. 8 and 9) if Condition 1 is satisfied and to Step 507 (the succeeding processes corresponding to Steps 1105 and 1305 of FIGS. 3 and 5) if Condition 1 is not satisfied. More specifically, if for example a radio access bearer that matches RAB information (RAB info), which is a part of the "RAB information for setup" information elements, exists as a currently established existing radio access bearer for UE 60, the RADIO BEARER SETUP message indicates reconfiguration and Condition 1 is determined to be satisfied.

In Step 502, control unit 61 determines whether or not Condition 2 is satisfied, this Condition 2 being that a TM radio bearer does not currently exist for the core network domain (CN domain) that is designated by the core network domain ID (CN domain identity) information element contained in the RADIO BEARER SETUP message, and moreover, that at least one TM radio bearer is contained in a "RB information to setup" information element that is a part of the "RAB information for setup" information elements; and proceeds to Step 504 to execute new START value settings if Condition 2 is satisfied and proceeds to Step 503 if Condition 2 is not satisfied. In the present exemplary embodiment, the circuit switching domain is the CN domain designated by the "CN domain identity" information element that is contained in the RADIO BEARER SETUP message, i.e., the CN domain designated by the RADIO BEARER SETUP message. In addition, satisfying Condition 2 means that the RADIO BEARER SETUP message indicates the reconfiguration from an E-DCH/HSDPA to a DCH in a state in which a radio access bearer, that is established for UE 60 and that is for a circuit switching domain that is mapped to a DCH, does not exist.

In Step 503, control unit 61 determines whether Condition 3 is satisfied, this Condition 3 being that the radio bearer of at least one of RLC-AM (RLC Acknowledged Mode) or RLC-UM (RLC Unacknowledged Mode) is included in "RB information to setup" information elements; and proceeds to Step 504 to execute setting of a new START value if Condition 3 is satisfied, and proceeds to Step 505 if not satisfied. Satisfying Condition 3 means that the RADIO BEARER SETUP message indicates reconfiguration from a DCH to an E-DCH/HSDPA.

In Step 504, control unit 61 uses variables such as COUNT-C that were used in the ciphering configuration before reconfiguration to calculate the START value and sets the START value that is calculated as the new START value. The START value that was calculated is stored in a storage unit (not shown) as the new START value. As an example of the method of calculating the START value, the method disclosed in Non-Patent Document 2 can be used.

In Step 505, control unit 61 releases the existing radio bearer resources. More specifically, control unit 61 releases the RLC entity and PDCP (Packet Data Convergence Protocol) that were used in the existing radio bearer, and releases the radio access bearer subflow relating to the existing radio bearer.

In Step 506, control unit 61 then uses the START value that is stored in the storage unit at that time to establish the radio bearer that was instructed by the "RAB information for setup" information elements.

The processing of Steps 507-509 that are carried out when Condition 1 is not satisfied in Step 501 are the same as the above-described Steps 502-504.

When reconfiguring the radio access bearer in the present exemplary embodiment as described hereinabove, the START value is calculated and the calculated START value is set as the new START value before existing radio bearer resources are released, and as a result, the effect is obtained in which proper ciphering executed on a circuit switched call is enabled, as in the first exemplary embodiment.

In the present exemplary embodiment, a START value is calculated before existing radio bearer resources are released, whereby the effect is obtained in which a START value can be set that takes into consideration variables such as COUNT-C that were used in ciphering configuration before reconfiguration.

(Third Exemplary Embodiment)

UE 60 according to the present exemplary embodiment is another example in which the operations of the first exemplary embodiment shown in FIG. 6 are made more specific, and the configuration itself is the same as in the first exemplary embodiment.

In other words, in summary, when reconfiguring a radio access bearer between a DCH and an E-DCH/HSDPA, control unit 61 carries out the operation of setting as the new START value a START value that was previously transmitted to UTRAN 10 before releasing the existing radio bearer resources.

The operations of the present exemplary embodiment are next described. The overall operations of the radio communication system of the present exemplary embodiment are, as with the second exemplary embodiment, the same as shown FIGS. 3, 5, 8, and 9. As a result, only the operations of UE 60 are here described.

[Operations of UE 60]

The operation of UE 60 according to the present exemplary embodiment is the same as that shown in FIG. 10 with the exception of the process of Step 504. As a result, only the process of Step 504 is here described.

In Step 504, control unit 61 sets the START value previously transmitted to UTRAN 10 (the most recent START value held by UTRAN 10) as the new START value. In addition, the previously transmitted START value is stored in the storage unit (not shown) as the new START value.

When a radio access bearer is reconfigured in the present exemplary embodiment as described hereinabove, the START value that was previously transmitted to UTRAN 10 is set as the new START value before the existing radio bearer resources are released, whereby the effect is obtained in which proper ciphering executed on a circuit switched call is enabled, as in the first exemplary embodiment.

In the present exemplary embodiment, the START value that was previously transmitted to UTRAN 10, i.e., the START value that is held by UTRAN 10 is set as the new START value, whereby both UE 60 and UTRAN 10 are able to implement ciphering configuration using the same START value for the data of a circuit switched call that is transmitted and received between UE 60 and UTRAN 10 before UTRAN 10 receives the RADIO BEARER SETUP COMPLETE message. In other words, the effect is obtained in which synchronization of the ciphering configuration of a circuit switched call, immediately after the reconfiguration of a radio access bearer, is facilitated.

(Fourth Exemplary Embodiment)

UE 60 according to the present exemplary embodiment is yet another example in which the operations of the first exemplary embodiment shown in FIG. 6 are made more specific, and the configuration itself is the same as that of the first exemplary embodiment.

In other words, in summary, when reconfiguring a radio access bearer between a DCH and an E-DCH/HSDPA, control unit 61 calculates the START value after releasing existing radio bearer resources and sets the calculated START value as the new START value.

The operations of the present exemplary embodiment are next described. The overall operations of the radio communication system of the present exemplary embodiment are, as with the second exemplary embodiment, the same as shown in FIGS. 3, 5, 8, and 9. As a result, only the operations of UE 60 are described here.

[Operations of UE 60]

The operations of UE 60 according to the present exemplary embodiment are next explained with reference to FIG. 11. The operations corresponding to Steps 1105, 1305, 305, and 405 in FIGS. 3, 5, 8, and 9, respectively, are here explained.

As shown in FIG. 11, in Step 601, control unit 61 first determines based on the "RAB information for setup" information elements contained in the RADIO BEARER SETUP message received from UTRAN 10 whether Condition 1 for the reconfiguration of the radio access bearer from an E-DCH/HSDPA to a DCH or the reconfiguration from a DCH to an E-DCH/HSDPA is satisfied, and proceeds to Step 602 (the following processes corresponding to Steps 305 and 405 of FIG. 8 and FIG. 9, respectively) if Condition 1 is satisfied, and proceeds to Step 607 (the following processes corresponding to Steps 1105 and 1305 of FIGS. 3 and 5, respectively) if Condition 1 is not satisfied. More specifically, if, for example, a radio access bearer that matches the RAB information that is a portion of the information elements "RAB information for setup" is present as an existing radio access bearer that is currently established for UE 60, the RADIO BEARER SETUP message indicates reconfiguration and control unit 1 determines that Condition 1 is satisfied.

In Step 602, control unit 61 releases the existing radio bearer resources. More specifically, control unit 61 releases the PDCP and RLC entity that are being used in the existing radio bearer and releases the subflow of the radio access bearer relating to the existing radio bearer.

In Step 603, control unit 61 determines whether Condition 2 is satisfied wherein a TM radio bearer of the CN domain designated by the "CN domain identity" information element contained in the RADIO BEARER SETUP message does not currently exist, and moreover, at least one TM radio bearer is contained in the "RB information to setup" information element that is a portion of the "RAB information for setup" information elements; and proceeds to Step 605 for executing settings of a new START value if Condition 2 is satisfied, and proceeds to Step 604 if Condition 2 is not satisfied. In the present exemplary embodiment, the circuit switching domain is the CN domain that is identified by the "CN domain identity" information element contained in the RADIO BEARER SETUP message, i.e., the CN domain identified by the RADIO BEARER SETUP message.

In Step 604, control unit 61 determines whether Condition 3 is satisfied wherein at least one RLC-AM or RLC-UM radio bearer is contained in the "RB information to setup" information elements, and proceeds to Step 605 for executing settings of a new START value if Condition 3 is satisfied and proceeds to Step 606 if Condition 3 is not satisfied.

In Step 605, control unit 61 calculates a START value and sets the calculated START value as the new START value. In addition, the START value that was calculated is stored in a storage unit (not shown) as the new START value.

Then, in Step 606, control unit 61 uses the START value that is stored in the storage unit at that time to establish the radio bearer that is designated by the "RAB information for setup" information element.

The processes of Steps 607-609 that are carried out when Condition 1 is not satisfied in Step 601 are the same as Steps 502-504 of FIG. 10.

When reconfiguring the radio access bearer in the above-described exemplary embodiment, a START value is calculated after the existing radio bearer resources are released and the calculated START value is set as the new START value, whereby, as in the first exemplary embodiment, the effect is obtained in which proper ciphering executed on a circuit switched call is enabled.

(Fifth Exemplary Embodiment)

UE 60 according to the present exemplary embodiment is yet another example in which the operations of the first exemplary embodiment shown in FIG. 6 are made specific, and the configuration itself is the same as the first exemplary embodiment.

In other words, in summary, when reconfiguring a radio access bearer between a DCH and an E-DCH/HSDPA, control unit 61 carries out operations of setting a new START value before releasing the existing radio bearer resources. In addition, when setting the new START value, control unit 61 implements the settings of the START value by either of the methods of the above-described second or third exemplary embodiments depending on whether a predetermined condition is satisfied or not.

The operations of the present exemplary embodiment are next described.

[Overall Operations of the Radio Communication System]

The overall operations of the radio communication system of the present exemplary embodiment are first described. The overall operations of the radio communication system, as with the second exemplary embodiment, are the same as shown in FIGS. 3, 5, 8, and 9. However, when reconfiguring a radio access bearer from a DCH to an E-DCH/HSDPA, the operations differ from the overall operations (FIG. 8) of the second exemplary embodiment regarding the point of setting the START value by the method of the third exemplary embodiment. As a result, only these overall operations are here described with reference to FIG. 12.

Figure 12:
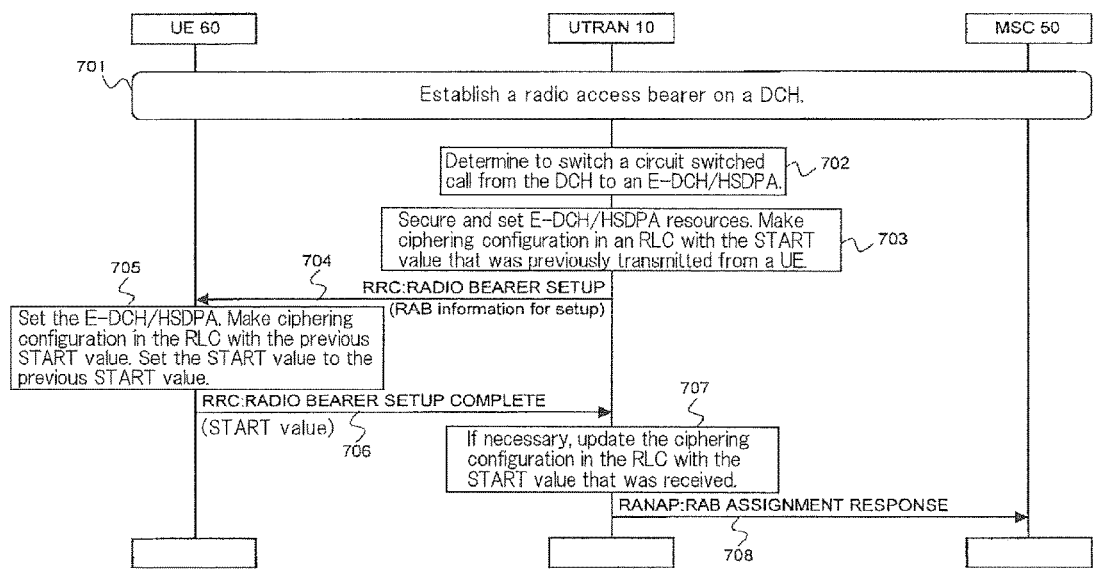
FIG. 12 is a sequence chart for explaining another example of the overall operations when reconfiguring a radio access bearer from a DCH to an E-DCH/HSDPA in a radio communication system.

It is here assumed that in Step 701 the radio access bearer is established on a DCH by the operations shown in FIG. 3 and a circuit switched call is mapped on the DCH, as shown in FIG. 12.

In this state, in Step 702, UTRAN 10 determines that the circuit switched call is to be remapped from the DCH to an E-DCH/HSDPA.

In Step 703, UTRAN 10 next secures and sets the E-DCH/HSDPA resources and uses the START value that was previously transmitted from UE 60 to make ciphering configuration in the RLC. In Step 704, UTRAN 10 further transmits a RADIO BEARER SETUP message containing the information element "RAB information for setup" instructing that a radio access bearer be established on an E-DCH/HSDPA.

Next, in Step 705, in accordance with the instructions of the information element "RAB information for setup" contained in the RADIO BEARER SETUP message that was received, UE 60 both releases the existing DCH resources and carries out E-DCH/HSDPA settings that establish the E-DCH/HSDPA radio access bearer. These E-DCH/HSDPA settings include setting of the previous START value to the new START value and the ciphering configuration in the RLC that uses this START value. In Step 706, UE 60 next transmits to UTRAN 10 a RADIO BEARER SETUP COMPLETE message that contains the START value that was set.

In Step 707, UTRAN 10 next uses the START value transmitted from UE 60 to update the ciphering configuration in the RLC if necessary. In other words, if the START value transmitted from UE 60 is the same as the previous START value, updating of the ciphering configuration is not absolutely necessary.

In Step 708, UTRAN 10 transmits to MSC 50 a RAB ASSIGNMENT RESPONSE message.

[Operations of UE 60]

The operations of UE 60 according to the present exemplary embodiment are next described with reference to FIG. 13. The operations of UE 60 according to the present exemplary embodiment differ from the embodiment shown in FIG. 10 in that Step 504 has been changed to Steps 801 and 802 and are otherwise the same. As a result, only the processes of Steps 801 and 802 are here described.

As shown in FIG. 13, Step 801 is carried out when Condition 2 is satisfied in Step 502. In this Step 801, control unit 61 calculates a START value and sets the calculated START value to the new START value. In addition, the calculated START value is stored in the storage unit (not shown) as the new START value.

In addition, Step 802 is carried out when Condition 3 is satisfied in Step 503. In this Step 802, control unit 61 sets the START value that was previously transmitted to UTRAN 10 to the new START value. In addition, the START value that was previously transmitted is stored in the storage unit (not shown) as the new START value.

When reconfiguring a radio access bearer in the present exemplary embodiment as described hereinabove, the START value that was previously transmitted to UTRAN 10 is set as the new START value before releasing existing radio bearer resources, whereby the effect is obtained in which proper ciphering executed on circuit switched calls is enabled, as in the first exemplary embodiment.

In addition, in the present exemplary embodiment, the effect is further obtained in which alteration of the method of setting a START value according to the content of the information element "RAB information for setup" is enabled.

For example, when the method of setting the START value previously transmitted to UTRAN 10 as the new START value is adopted, the effect is obtained in which the achievement of synchronization of the ciphering configuration of circuit switched calls by both UE 60 and UTRAN 10, immediately after the reconfiguration of the radio access bearer, as in the third exemplary embodiment, is facilitated; and when the method of setting the calculated START value as the new START value is adopted, the effect is obtained in which setting of a START value that takes into consideration variables such as COUNT-C of the existing radio access bearer, as in the second embodiment, is enabled.

Although the invention of the present application has been described with reference to exemplary embodiments, the invention of the present application is not limited to the above-described exemplary embodiments. The configuration and details of the invention of the present application are open to various modifications within the scope of the invention of the present application that will be readily understood by anyone of ordinary skill in the art.

For example, although a 3GPP radio communication system was described as one example in the first to fifth exemplary embodiments, the radio communication system, radio communication apparatus, and ciphering method of the first to fifth exemplary embodiments can also be applied in other radio communication systems in which the radio access bearer of the circuit switching domain is reconfigured between communication channels having different ciphering configuration methods (for example, variables). In such cases, ciphering configuration can be implemented using a new initial value that is set in the radio communication apparatus in both the radio communication apparatus and radio access network, whereby the effect is obtained in which proper ciphering executed on circuit switched calls is enabled.

In addition, although operations for setting a new START value before releasing existing radio bearer resources were described as one example in the third and fifth exemplary embodiments, a new START value can be set after releasing the existing radio bearer resources as in the fourth exemplary embodiment.

The present application claims priority based on JP-A-2007-336729 for which application was submitted on Dec. 27, 2007 and incorporates all of the disclosures of that application.

What is claimed is:

1. A radio communication apparatus comprising:
    a controller configured to, if a radio access bearer (RAB) for a circuit switching domain is reconfigured between dedicated channel (DCH) and enhanced uplink dedicated channel/High Speed Downlink Packet Access (E-DCH/HSDPA), and a radio access bearer that matches RAB information exists as an established radio access bearer, and at least one RLC-AM or RLC-UM radio bearer is included in information element of RB information to setup, calculates a start value that is used on new radio access bearer; and
    a transceiver configured to communicate with a radio access network.

2. The radio communication apparatus according to claim 1,
    wherein the transceiver transmits the start value to a radio access network.

3. The radio communication apparatus according to claim 1,
    if a radio access bearer for a circuit switching domain is reconfigured between a DCH and E-DCH/HSDPA and an RAB corresponded to RAB information exists as an established RAB, the controller releases the PDCP (Packet Data Convergence Protocol) and RLC entities used in the existing radio bearer and releases the radio access bearer subflow relating to the existing radio bearer.

4. The radio communication apparatus according to claim 1,
    wherein the controller calculates the start value, if a RAB for a circuit switching domain is reconfigured between a DCH and E-DCH/HSDPA and a RAB corresponded to RAB information exists as an established RAB and there exists no transparent mode (TM) radio bearer for a core network (CN) domain included in an information element of CN domain identity (ID), and at least one TM radio bearer is included in an information element of radio bearer (RB) information to setup.

5. The radio communication apparatus according to claim 1,
the information element of RB information to setup are included in a radio bearer setup message received from a radio access network.

6. The radio communication apparatus according to claim 1,
the start value is used for initializing information relating with COUNT-C that is used for ciphering.

7. A communication method comprising:
receiving a start value from a radio communication apparatus, wherein if a radio access bearer (RAB) for a circuit switching domain is reconfigured between dedicated channel (DCH) and enhanced uplink dedicated channel/High Speed Downlink Packet Access (E-DCH/HSDPA), and a radio access bearer that matches RAB information exists as an established radio access bearer, and at least one RLC-AM or RLC-UM radio bearer is included in information element of RB information to setup, calculates a start value that is used on new radio access bearer; and
a transceiver configured to communicate with a radio access network.

8. The communication method according to claim 7,
wherein the transceiver transmits the start value to a radio access network.

9. The radio communication method according to claim 7,
if a radio access bearer for a circuit switching domain is reconfigured between a DCH and E-DCH/HSDPA and an RAB corresponded to RAB information exists as an established RAB, the controller releases the PDCP (Packet Data Convergence Protocol) and RLC entities used in the existing radio bearer and releases the radio access bearer subflow relating to the existing radio bearer.

10. The communication method according to claim 7,
wherein the controller calculates the start value, if a RAB for a circuit switching domain is reconfigured between a DCH and E-DCH/HSDPA and a RAB corresponded to RAB information exists as an established RAB and there exists no transparent mode (TM) radio bearer for a core network (CN) domain included in an information element of CN domain identity (ID), and at least one TM radio bearer is included in an information element of radio bearer (RB) information to setup.

11. The communication method according to claim 7,
the information element of RB information to setup are included in a radio bearer setup message received from a radio access network.

12. The communication method according to claim 7,
the start value is used for initializing information relating with COUNT-C that is used for ciphering.

13. An apparatus in a radio access network comprising:
a transceiver configured to receive a start value from a radio communication apparatus; and
a controller configured to cipher data using COUNT-C which is based on the start value;
wherein if a radio access bearer (RAB) for a circuit switching domain is reconfigured between dedicated channel (DCH) and enhanced uplink dedicated channel/High Speed Downlink Packet Access (E-DCH/HSDPA), and a radio access bearer that matches RAB information exists as an established radio access bearer, and at least one RLC-AM or RLC-UM radio bearer is included in information element of RB information to setup, the start value is calculated by the radio communication apparatus.

14. The apparatus in the radio access network according to claim 13,
wherein the start value is calculated by the radio communication apparatus, if a RAB for a circuit switching domain is reconfigured between a DCH and E-DCH/HSDPA and a RAB corresponded to RAB information exists as an established RAB and there exists no transparent mode (TM) radio bearer for a core network (CN) domain included in an information element of CN domain identity (ID), and at least one TM radio bearer is included in an information element of radio bearer (RB) information to setup.

15. The apparatus in the radio access network according to claim 13,
the transceiver transmits a radio bearer setup message, including the information element of RB information to setup, to the radio communication apparatus.

16. The apparatus in the radio access network according to claim 13, the start value is used for initializing information relating with COUNT-C.

* * * * *